US009552777B2

(12) United States Patent
Travis (10) Patent No.: US 9,552,777 B2
(45) Date of Patent: Jan. 24, 2017

(54) PHASE CONTROL BACKLIGHT

(71) Applicant: Microsoft Technology Licensing, LLC, Redmond, WA (US)

(72) Inventor: Adrian R. L. Travis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 143 days.

(21) Appl. No.: 13/891,971

(22) Filed: May 10, 2013

(65) Prior Publication Data

US 2014/0333517 A1    Nov. 13, 2014

(51) Int. Cl.
| | |
|---|---|
| G09G 3/36 | (2006.01) |
| G09G 3/34 | (2006.01) |
| F21V 8/00 | (2006.01) |
| G02F 1/29 | (2006.01) |
| G02F 1/295 | (2006.01) |
| G02B 27/22 | (2006.01) |
| H04N 13/04 | (2006.01) |

(Continued)

(52) U.S. Cl.
CPC ............ *G09G 3/3406* (2013.01); *G02B 6/005* (2013.01); *G02B 27/225* (2013.01); *G02F 1/292* (2013.01); *G02F 1/2955* (2013.01); *G09G 3/36* (2013.01); *H04N 13/0418* (2013.01); *G02B 27/0093* (2013.01); *G02F 1/133615* (2013.01)

(58) Field of Classification Search
None
See application file for complete search history.

(56) References Cited

U.S. PATENT DOCUMENTS

| | | |
|---|---|---|
| 578,325 A | 3/1897 | Fleming |
| 4,046,975 A | 9/1977 | Seeger, Jr. |
| 4,065,649 A | 12/1977 | Carter et al. |

(Continued)

FOREIGN PATENT DOCUMENTS

| | | |
|---|---|---|
| CN | 1650202 | 8/2005 |
| CN | 102483522 | 5/2012 |

(Continued)

OTHER PUBLICATIONS

"Foreign Office Action", JP Application No. 2012-525722, Apr. 22, 2014, 15 pages.

(Continued)

*Primary Examiner* — Andrew Sasinowski
*Assistant Examiner* — Henok Heyi
(74) *Attorney, Agent, or Firm* — Brandon Roper; Judy Yee; Micky Minhas (57) ABSTRACT

This document describes techniques and apparatuses for implementing a phase control backlight. A phase control backlight is configured to concentrate light to each pupil of a viewer of a display to cause images to be displayed to each pupil of the viewer. The phase control backlight can include an illuminator and a light guide that includes a diffraction grating. The light guide is configured to receive light rays from the illuminator, and to diffract light rays out of the light guide via the diffraction grating. In accordance with various embodiments, the light guide can be controlled to alter a phase of the light rays as the light rays are guided within the light guide to cause the diffracted light rays to converge to a concentration point that corresponds to a position in space of each pupil of the viewer.

20 Claims, 6 Drawing Sheets

(51) Int. Cl.
G02F 1/1335 (2006.01)
G02B 27/00 (2006.01)

(56) References Cited

U.S. PATENT DOCUMENTS

| | | |
|---|---|---|
| 4,243,861 A | 1/1981 | Strandwitz |
| 4,302,648 A | 11/1981 | Sado et al. |
| 4,317,013 A | 2/1982 | Larson |
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,577,822 A | 3/1986 | Wilkerson |
| 4,588,187 A | 5/1986 | Dell |
| 4,607,147 A | 8/1986 | Ono et al. |
| 4,651,133 A | 3/1987 | Ganesan et al. |
| 4,735,394 A | 4/1988 | Facco |
| 4,735,495 A | 4/1988 | Henkes |
| 5,220,521 A | 6/1993 | Kikinis |
| 5,283,559 A | 2/1994 | Kalendra et al. |
| 5,319,455 A | 6/1994 | Hoarty et al. |
| 5,331,443 A | 7/1994 | Stanisci |
| 5,480,118 A | 1/1996 | Cross |
| 5,546,271 A | 8/1996 | Gut et al. |
| 5,548,477 A | 8/1996 | Kumar et al. |
| 5,558,577 A | 9/1996 | Kato |
| 5,576,870 A | 11/1996 | Ohmae |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,806,955 A | 9/1998 | Parkyn, Jr. et al. |
| 5,807,175 A | 9/1998 | Davis et al. |
| 5,808,713 A | 9/1998 | Broer et al. |
| 5,818,361 A | 10/1998 | Acevedo |
| 5,828,770 A | 10/1998 | Leis et al. |
| 5,838,403 A | 11/1998 | Jannson et al. |
| 5,874,697 A | 2/1999 | Selker et al. |
| 5,926,170 A | 7/1999 | Oba |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,072,551 A | 6/2000 | Jannson et al. |
| 6,112,797 A | 9/2000 | Colson et al. |
| 6,124,906 A | 9/2000 | Kawada et al. |
| 6,129,444 A | 10/2000 | Tognoni |
| 6,178,443 B1 | 1/2001 | Lin |
| 6,254,105 B1 | 7/2001 | Rinde et al. |
| 6,256,447 B1 | 7/2001 | Laine |
| 6,279,060 B1 | 8/2001 | Luke et al. |
| 6,329,617 B1 | 12/2001 | Burgess |
| 6,344,791 B1 | 2/2002 | Armstrong |
| 6,380,497 B1 | 4/2002 | Hashimoto et al. |
| 6,437,682 B1 | 8/2002 | Vance |
| 6,511,378 B1 | 1/2003 | Bhatt et al. |
| 6,529,179 B1 | 3/2003 | Hashimoto et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,597,347 B1 | 7/2003 | Yasutake |
| 6,600,121 B1 | 7/2003 | Olodort et al. |
| 6,603,408 B1 | 8/2003 | Gaba |
| 6,617,536 B2 | 9/2003 | Kawaguchi |
| 6,648,485 B1 | 11/2003 | Colgan et al. |
| 6,651,943 B2 | 11/2003 | Cho et al. |
| 6,685,369 B2 | 2/2004 | Lien |
| 6,695,273 B2 | 2/2004 | Iguchi |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,784,869 B1 | 8/2004 | Clark et al. |
| 6,798,464 B2 | 9/2004 | Bietsch et al. |
| 6,813,143 B2 | 11/2004 | Makela |
| 6,819,316 B2 | 11/2004 | Schulz et al. |
| 6,847,424 B2 | 1/2005 | Gotoh et al. |
| 6,856,506 B2 | 2/2005 | Doherty et al. |
| 6,861,961 B2 | 3/2005 | Sandbach et al. |
| 6,870,671 B2 | 3/2005 | Travis |
| 6,894,749 B2 | 5/2005 | Suzuki et al. |
| 6,895,164 B2 | 5/2005 | Saccomanno |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,051,149 B2 | 5/2006 | Wang et al. |
| 7,083,295 B1 | 8/2006 | Hanna |
| 7,091,436 B2 | 8/2006 | Serban |
| 7,104,679 B2 | 9/2006 | Shin et al. |
| 7,106,222 B2 | 9/2006 | Ward et al. |
| 7,123,292 B1 | 10/2006 | Seeger et al. |
| 7,153,017 B2 | 12/2006 | Yamashita et al. |
| 7,164,454 B2 | 1/2007 | Numata et al. |
| 7,194,662 B2 | 3/2007 | Do et al. |
| 7,213,991 B2 | 5/2007 | Chapman et al. |
| 7,260,823 B2 | 8/2007 | Schlack et al. |
| 7,277,087 B2 | 10/2007 | Hill et al. |
| 7,301,759 B2 | 11/2007 | Hsiung |
| 7,370,342 B2 | 5/2008 | Ismail et al. |
| 7,375,885 B2 | 5/2008 | Ijzerman et al. |
| 7,431,489 B2 | 10/2008 | Yeo et al. |
| 7,447,934 B2 | 11/2008 | Dasari et al. |
| 7,469,386 B2 | 12/2008 | Bear et al. |
| 7,486,165 B2 | 2/2009 | Ligtenberg et al. |
| 7,499,037 B2 | 3/2009 | Lube |
| 7,502,803 B2 | 3/2009 | Culter et al. |
| 7,503,684 B2 | 3/2009 | Ueno et al. |
| 7,528,374 B2 | 5/2009 | Smitt et al. |
| 7,542,052 B2 | 6/2009 | Solomon et al. |
| 7,558,594 B2 | 7/2009 | Wilson |
| 7,559,834 B1 | 7/2009 | York |
| 7,572,045 B2 | 8/2009 | Hoelen et al. |
| RE40,891 E | 9/2009 | Yasutake |
| 7,631,327 B2 | 12/2009 | Dempski et al. |
| 7,636,921 B2 | 12/2009 | Louie |
| 7,639,876 B2 | 12/2009 | Clary et al. |
| 7,656,392 B2 | 2/2010 | Bolender |
| 7,731,147 B2 | 6/2010 | Rha |
| 7,733,326 B1 | 6/2010 | Adiseshan |
| 7,777,972 B1 | 8/2010 | Chen et al. |
| 7,782,342 B2 | 8/2010 | Koh |
| 7,813,715 B2 | 10/2010 | McKillop et al. |
| 7,844,985 B2 | 11/2010 | Hendricks et al. |
| 7,884,807 B2 | 2/2011 | Hovden et al. |
| D636,397 S | 4/2011 | Green |
| 7,928,964 B2 | 4/2011 | Kolmykov-Zotov et al. |
| 7,945,717 B2 | 5/2011 | Rivalsi |
| 7,957,082 B2 | 6/2011 | Mi et al. |
| 7,970,246 B2 | 6/2011 | Travis et al. |
| 7,973,771 B2 | 7/2011 | Geaghan |
| 7,978,281 B2 | 7/2011 | Vergith et al. |
| 8,016,255 B2 | 9/2011 | Lin |
| 8,053,688 B2 | 11/2011 | Conzola et al. |
| 8,065,624 B2 | 11/2011 | Morin et al. |
| 8,069,356 B2 | 11/2011 | Rathi et al. |
| 8,098,233 B2 | 1/2012 | Hotelling et al. |
| 8,118,274 B2 | 2/2012 | McClure et al. |
| 8,130,203 B2 | 3/2012 | Westerman |
| 8,154,524 B2 | 4/2012 | Wilson et al. |
| 8,162,282 B2 | 4/2012 | Hu et al. |
| D659,139 S | 5/2012 | Gengler |
| 8,169,421 B2 | 5/2012 | Wright et al. |
| 8,189,973 B2 | 5/2012 | Travis et al. |
| 8,229,509 B2 | 7/2012 | Paek et al. |
| 8,229,522 B2 | 7/2012 | Kim et al. |
| 8,267,368 B2 | 9/2012 | Torii et al. |
| 8,274,784 B2 | 9/2012 | Franz et al. |
| 8,322,290 B1 | 12/2012 | Mignano |
| 8,351,744 B2 | 1/2013 | Travis et al. |

(56) References Cited

U.S. PATENT DOCUMENTS

| | | |
|---|---|---|
| 8,416,559 B2 | 4/2013 | Agata et al. |
| 2002/0134828 A1 | 9/2002 | Sandbach et al. |
| 2003/0163611 A1 | 8/2003 | Nagao |
| 2003/0197687 A1 | 10/2003 | Shetter |
| 2004/0258924 A1 | 12/2004 | Berger et al. |
| 2004/0268000 A1 | 12/2004 | Barker et al. |
| 2005/0057515 A1 | 3/2005 | Bathiche |
| 2005/0059489 A1 | 3/2005 | Kim |
| 2005/0078237 A1* | 4/2005 | Klaus .............. G02F 1/13306 349/98 |
| 2005/0146512 A1 | 7/2005 | Hill et al. |
| 2005/0264653 A1 | 12/2005 | Starkweather et al. |
| 2005/0264988 A1 | 12/2005 | Nicolosi |
| 2006/0083004 A1 | 4/2006 | Cok |
| 2006/0085658 A1 | 4/2006 | Allen et al. |
| 2006/0125799 A1 | 6/2006 | Hillis et al. |
| 2006/0146573 A1 | 7/2006 | Iwauchi et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0187216 A1 | 8/2006 | Trent, Jr. et al. |
| 2006/0195522 A1 | 8/2006 | Miyazaki |
| 2006/0215244 A1 | 9/2006 | Yosha et al. |
| 2007/0062089 A1 | 3/2007 | Homer et al. |
| 2007/0072474 A1 | 3/2007 | Beasley et al. |
| 2007/0182342 A1 | 8/2007 | Hagen et al. |
| 2007/0182663 A1 | 8/2007 | Biech |
| 2007/0182722 A1 | 8/2007 | Hotelling et al. |
| 2007/0183038 A1* | 8/2007 | Hwang ............... G02B 6/0038 359/487.02 |
| 2007/0201246 A1 | 8/2007 | Yeo et al. |
| 2007/0220708 A1 | 9/2007 | Lewis |
| 2007/0234420 A1 | 10/2007 | Novotney et al. |
| 2007/0236408 A1 | 10/2007 | Yamaguchi et al. |
| 2007/0236475 A1 | 10/2007 | Wherry |
| 2007/0247432 A1 | 10/2007 | Oakley |
| 2007/0258140 A1* | 11/2007 | Shestak ............. H04N 13/0404 359/465 |
| 2007/0260892 A1 | 11/2007 | Paul et al. |
| 2007/0274099 A1 | 11/2007 | Tai et al. |
| 2007/0283179 A1 | 12/2007 | Burnett et al. |
| 2008/0005423 A1 | 1/2008 | Jacobs et al. |
| 2008/0104437 A1 | 5/2008 | Lee |
| 2008/0151478 A1 | 6/2008 | Chern |
| 2008/0158185 A1 | 7/2008 | Westerman |
| 2008/0158479 A1 | 7/2008 | Qi |
| 2008/0228969 A1 | 9/2008 | Cheah et al. |
| 2008/0238884 A1 | 10/2008 | Harish |
| 2008/0239420 A1 | 10/2008 | McGrew |
| 2008/0253822 A1 | 10/2008 | Matias |
| 2008/0309636 A1 | 12/2008 | Feng et al. |
| 2008/0316002 A1 | 12/2008 | Brunet et al. |
| 2008/0316768 A1 | 12/2008 | Travis |
| 2008/0320190 A1 | 12/2008 | Lydon et al. |
| 2009/0009476 A1 | 1/2009 | Daley, III |
| 2009/0073957 A1 | 3/2009 | Newland et al. |
| 2009/0140985 A1 | 6/2009 | Liu |
| 2009/0195497 A1 | 8/2009 | Fitzgerald et al. |
| 2009/0251008 A1 | 10/2009 | Sugaya |
| 2009/0259865 A1 | 10/2009 | Sheynblat et al. |
| 2009/0262492 A1 | 10/2009 | Whitchurch et al. |
| 2009/0265670 A1 | 10/2009 | Kim et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy |
| 2010/0051432 A1 | 3/2010 | Lin et al. |
| 2010/0053534 A1 | 3/2010 | Hsieh et al. |
| 2010/0074077 A1* | 3/2010 | Katayama ............. G02B 3/14 369/53.12 |
| 2010/0077237 A1 | 3/2010 | Sawyers |
| 2010/0085321 A1 | 4/2010 | Pundsack |
| 2010/0102182 A1 | 4/2010 | Lin |
| 2010/0103112 A1 | 4/2010 | Yoo et al. |
| 2010/0123686 A1 | 5/2010 | Klinghult et al. |
| 2010/0133398 A1 | 6/2010 | Chiu et al. |
| 2010/0142130 A1 | 6/2010 | Wang et al. |
| 2010/0149111 A1 | 6/2010 | Olien |
| 2010/0161522 A1 | 6/2010 | Tirpak et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0222110 A1 | 9/2010 | Kim et al. |
| 2010/0231556 A1 | 9/2010 | Mines et al. |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0325155 A1 | 12/2010 | Skinner et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0036965 A1 | 2/2011 | Zhang et al. |
| 2011/0037721 A1 | 2/2011 | Cranfill et al. |
| 2011/0043142 A1 | 2/2011 | Travis |
| 2011/0043990 A1 | 2/2011 | Mickey et al. |
| 2011/0044579 A1 | 2/2011 | Travis et al. |
| 2011/0044582 A1 | 2/2011 | Travis et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0102690 A1* | 5/2011 | Kikuchi ............. H04N 13/0409 349/15 |
| 2011/0134032 A1 | 6/2011 | Chiu et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0179864 A1 | 7/2011 | Raasch et al. |
| 2011/0184646 A1 | 7/2011 | Wong et al. |
| 2011/0187964 A1* | 8/2011 | Li ..................... G02F 1/1335 349/62 |
| 2011/0193787 A1 | 8/2011 | Morishige et al. |
| 2011/0205372 A1 | 8/2011 | Miramontes |
| 2011/0227913 A1 | 9/2011 | Hyndman |
| 2011/0228562 A1 | 9/2011 | Travis et al. |
| 2011/0242138 A1 | 10/2011 | Tribble |
| 2011/0242298 A1 | 10/2011 | Bathiche et al. |
| 2011/0248930 A1 | 10/2011 | Larsen |
| 2011/0290686 A1 | 12/2011 | Huang |
| 2011/0292321 A1* | 12/2011 | Travis ................ G02B 6/0056 349/65 |
| 2011/0297566 A1 | 12/2011 | Gallagher et al. |
| 2011/0304577 A1 | 12/2011 | Brown |
| 2011/0316807 A1 | 12/2011 | Corrion |
| 2012/0007821 A1 | 1/2012 | Zaliva |
| 2012/0011462 A1 | 1/2012 | Westerman et al. |
| 2012/0023459 A1 | 1/2012 | Westerman |
| 2012/0024682 A1 | 2/2012 | Huang et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0062850 A1 | 3/2012 | Travis |
| 2012/0075249 A1 | 3/2012 | Hoch |
| 2012/0081316 A1 | 4/2012 | Sirpal et al. |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0113579 A1 | 5/2012 | Agata et al. |
| 2012/0117409 A1 | 5/2012 | Lee et al. |

(56) References Cited

U.S. PATENT DOCUMENTS

| | | | |
|---|---|---|---|
| 2012/0127118 A1 | 5/2012 | Nolting et al. | |
| 2012/0140396 A1 | 6/2012 | Zeliff et al. | |
| 2012/0145525 A1 | 6/2012 | Ishikawa | |
| 2012/0162693 A1 | 6/2012 | Ito | |
| 2012/0175487 A1 | 7/2012 | Goto | |
| 2012/0182242 A1 | 7/2012 | Lindahl et al. | |
| 2012/0194448 A1 | 8/2012 | Rothkopf | |
| 2012/0206937 A1 | 8/2012 | Travis et al. | |
| 2012/0224073 A1 | 9/2012 | Miyahara | |
| 2012/0246377 A1 | 9/2012 | Bhesania | |
| 2012/0249537 A1* | 10/2012 | Bae | H04N 13/0497 345/419 |
| 2012/0256959 A1 | 10/2012 | Ye et al. | |
| 2012/0274811 A1 | 11/2012 | Bakin | |
| 2012/0300275 A1 | 11/2012 | Vilardell et al. | |
| 2012/0312955 A1 | 12/2012 | Randolph | |
| 2013/0050584 A1* | 2/2013 | Kaihotsu | G09G 3/3406 348/731 |
| 2013/0063873 A1 | 3/2013 | Wodrich et al. | |

FOREIGN PATENT DOCUMENTS

| | | |
|---|---|---|
| EP | 0769881 | 4/1997 |
| EP | 1832914 | 9/2007 |
| EP | 2353978 | 8/2011 |
| EP | 2431786 | 3/2012 |
| JP | 10326124 | 12/1998 |
| JP | 20000106021 | 4/2000 |
| JP | 2002100226 | 4/2002 |
| JP | 2002162912 | 6/2002 |
| JP | 2003215349 | 7/2003 |
| JP | 2004171948 | 6/2004 |
| JP | 2005331565 | 12/2005 |
| JP | 2006004877 | 1/2006 |
| JP | 2006294361 | 10/2006 |
| JP | 2008066152 | 3/2008 |
| JP | 2008286874 | 7/2008 |
| JP | 2009059583 | 3/2009 |
| JP | 2013502697 | 1/2013 |
| KR | 1020010039013 | 5/2001 |
| KR | 20080009490 | 1/2008 |
| KR | 20080055051 | 6/2008 |
| KR | 20120049890 | 5/2012 |
| RU | 2012105980 | 8/2013 |
| WO | WO-03048635 | 6/2003 |
| WO | WO-03083530 | 10/2003 |
| WO | WO-03091771 | 11/2003 |
| WO | WO-2005045488 | 5/2005 |
| WO | WO-2005059874 | 6/2005 |
| WO | WO-2006044818 | 4/2006 |
| WO | WO-2008044018 | 4/2008 |
| WO | WO-2010027904 | 3/2010 |
| WO | WO-2010138345 | 12/2010 |
| WO | WO-2011022625 | 2/2011 |
| WO | WO-2012085045 | 6/2012 |

OTHER PUBLICATIONS

"Foreign Office Action", Chinese Application No. 201080037117.7, (Aug. 20, 2013), 8 pages.
"Foreign Notice of Allowance", RU Application No. 2012105980, Jul. 29, 2014, 12 pages.
"Foreign Office Action", CN Application No. 201080037117.7, Jul. 1, 2014, 9 pages.
"Foreign Office Action", JP Application No. 2012-525722, Aug. 13, 2014, 17 pages.
"International Search Report and Written Opinion", Application No. PCT/US2014/037404, Jul. 29, 2014, 10 pages.
Imai, et al., "Illumination Uniformity of an Edge-Lit Backlight with Emission Angle Control", Retrieved at http://www.opticsinfobase.org/view_article.cfm?gotourl=http%3A%2F%2Fwww%2Eopticsinfobase%2Eorg%2FDirectPDFAccess%2F69DE147E%2D0453%2D91CF%2DB9CC4A6D3F80E709%5F170128%2Foe%2D16%2D16%2D11969%2Epdf%3Fda%3D1%26id%3D170128%26seq%3D0%26mobile%3Dno&org=, In Optics Express vol. 16, No. 16, Aug. 4, 2008, pp. 6.
Bos, et al., "Optical Simulation of Liquid Crystal Diffraction Gratings", Retrieved at http://www.lci.kent.edu/ipp/techjournals/Vol%2011/Titus.pdf, Feb. 14, 2013, pp. 7.
"Efficient Collimation of Light With Optical Wedge", U.S. Appl. No. 61/235,922, filed Aug. 21, 2009, pp. 46.
Tanaka, et al., "Fabrication of a Tapered Structure by Means of Exposure to Diffracted UV Light", Retrieved at <<http://ieeexplore.ieee.org/stamp/stamp.jsp?tp=&arnumber=4110400>>, In International Symposium on Micro-NanoMechatronics and Human Science, Nov. 5, 2006, pp. 6.
"Accesssing Device Sensors", retrieved from <https://developer.palm.com/content/api/dev-guide/pdk/accessing-device-sensors.html> on May 25, 2012, 4 pages.
"ACPI Docking for Windows Operating Systems", Retrieved from: <http://www.scritube.com/limba/engleza/software/ACPI-Docking-for-Windows-Opera331824193.php> on Jul. 6, 2012,10 pages.
"Cholesteric Liquid Crystal", Retrieved from: <http://en.wikipedia.org/wiki/Cholesteric_liquid_crystal> on Aug. 6, 2012,(Jun. 10, 2012), 2 pages.
"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, (Jan. 2013), 1 page.
"Corrected Notice of Allowance", U.S. Appl. No. 13/470,633, (Apr. 9, 2013), 2 pages.
"DR2PA", retrieved from <http://www.archiainment.co.uk/wp-content/uploads/2012/08/DR2PA-AU-US-size-Data-Sheet-Rev-H_LOGO.pdf> on Sep. 17, 2012, 4 pages.
"European Search Report", Application No. 10840648.5, (Jun. 25, 2013),10 pages.
"Final Office Action", U.S. Appl. No. 13/651,195, (Apr. 18, 2013),13 pages.
"Final Office Action", U.S. Appl. No. 13/651,232, (May 21, 2013), 21 pages.
"Final Office Action", U.S. Appl. No. 13/651,287, (May 3, 2013),16 pages.
"First One Handed Fabric Keyboard with Bluetooth Wireless Technology", Retrieved from: <http://press.xtvworld.com/article3817.html> on May 8, 2012,(Jan. 6, 2005), 2 pages.
"Force and Position Sensing Resistors: An Emerging Technology", *Interlink Electronics*, Available at <http://staff.science.uva.nl/~vlaander/docu/FSR/An_Exploring_Technology.pdf>,(Feb. 1990), pp. 1-6
"Frogpad Introduces Weareable Fabric Keyboard with Bluetooth Technology", Retrieved from: <http://www.geekzone.co.nz/content.asp?contentid=3898> on May 7, 2012,(Jan. 7, 2005), 3 pages.
"How to Use the iPad's Onscreen Keyboard", Retrieved from <http://www.dummies.com/how-to/content/how-to-use-the-ipads-onscreen-keyboard.html> on Aug. 28, 2012, 3 pages.
"i-Interactor electronic pen", Retrieved from: <http://www.alibaba.com/product-gs/331004878/i_Interactor_electronic_pen.html> on Jun. 19, 2012, 5 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.
"International Search Report", PCT Application No. PCT/US2010/045676, (Apr. 28, 2011), 2 pages.
"International Search Report", PCT Application No. PCT/US2010/046129, (Mar. 2, 2011), 9 pages.
"Membrane Keyboards & Membrane Keypads", Retrieved from: <http://www.pannam.com/> on May 9, 2012,(Mar. 4, 2009), 2 pages.
"Motion Sensors", *Android Developers*, retrieved from <http://developer.android.com/guide/topics/sensors/sensor_motion.html>. on May 25, 2012, 7 pages.
"MPC Fly Music Production Controller", *AKAI Professional*, Retrieved from:<http://www.akaiprompc.com/mpc-fly> on Jul. 9, 2012, 4 pages.

(56) References Cited

OTHER PUBLICATIONS

"NI Releases New Maschine & Maschine Mikro", Retrieved from <http://www.djbooth.net/index/dj-equipment/entry/ni-releases-new-maschine-mikro/> on Sep. 17, 2012, 19 pages.
"Non-Final Office Action", U.S. Appl. No. 12/621,399, (Feb. 1, 2011), 6 pages.
"Non-Final Office Action", U.S. Appl. No.. 12/883,077, (Jan. 31, 2011), 6 pages.
"Non-Final Office Action", U.S. Appl. No. 13/149,501, (Dec. 8, 2011), 8 pages.
"Non-Final Office Action", U.S. Appl. No. 13/453,744, (Jul. 12, 2012), 6 pages.
"Non-Final Office Action", U.S. Appl. No. 13/471,001, (Feb. 19, 2013),15 pages.
"Non-Final Office Action", U.S. Appl. No. 13/471,139, (Mar. 21, 2013),12 pages.
"Non-Final Office Action", U.S. Appl. No. 13/471,202, (Feb. 11, 2013),10 pages.
"Non-Final Office Action", U.S. Appl. No. 13/471,336, (Jan. 18, 2013),14 pages.
"Non-Final Office Action", U.S. Appl. No. 13/651,195, (Jan. 2, 2013),14 pages.
"Non-Final Office Action", U.S. Appl. No. 13/651,232, (Jan. 17, 2013),15 pages.
"Non-Final Office Action", U.S. Appl. No. 13/651,272, (Feb. 12, 2013),10 pages.
"Non-Final Office Action", U.S. Appl. No. 13/651,287, (Jan. 29, 2013),13 pages.
"Non-Final Office Action", U.S. Appl. No. 13/651,304, (Mar. 22, 2013), 9 pages.
"Non-Final Office Action", U.S. Appl. No. 13/651,327, (Mar. 22, 2013), 6 pages.
"Non-Final Office Action", U.S. Appl. No. 13/651,726, (Apr. 15, 2013), 6 pages.
"Non-Final Office Action", U.S. Appl. No. 13/651,871, (Mar. 18, 2013),14 pages.
"Non-Final Office Action", U.S. Appl. No. 13/651,976, (Feb. 22, 2013),16 pages.
"Non-Final Office Action", U.S. Appl. No. 13/653,321, (Feb. 1, 2013),13 pages.
"Non-Final Office Action", U.S. Appl. No. 13/653,682, (Feb. 7, 2013),11 pages.
"Non-Final Office Action", U.S. Appl. No. 13/653,682, (Jun. 3, 2013),14 pages.
"Non-Final Office Action", U.S. Appl. No. 13/656,055, (Apr. 23, 2013),11 pages.
"Notice of Allowance", U.S. Appl. No. 12/883,077, (Apr. 11, 2011), 8 pages.
"Notice of Allowance", U.S. Appl. No. 13/149,501, (Mar. 22, 2012), 8 pages.
"Notice of Allowance", U.S. Appl. No. 13/453,744, (Oct. 24, 2012), 7 pages.
"Notice of Allowance", U.S. Appl. No. 13/470,633, (Mar. 22, 2013), 7 pages.
"Notice of Allowance", U.S. Appl. No. 13/471,202, (May 28, 2013), 7 pages.
"Notice of Allowance", U.S. Appl. No. 13/651,272, (May 2, 2013), 7 pages.
"Notice of Allowance", U.S. Appl. No. 13/651,726, (May 31, 2013), 5 pages.
"On-Screen Keyboard for Windows 7, Vista, XP with Touchscreen", Retrieved from <www.comfort-software.com/on-screen-keyboard.html> on Aug. 28, 2012, (Feb. 2, 2011), 3 pages.
"Position Sensors", Android Developers, retrieved from <http://developer.android.com/guide/topics/sensors/sensors_position.html> on May 25, 2012, 5 pages.
"Real-Time Television Content Platform", retrieved from <http://www.accenture.com/us-en/pages/insight-real-time-television-platform.aspx> on Mar. 10, 2011, (May 28, 2002),3 pages.
"Reflex LCD Writing Tablets", retrieved from <http://www.kentdisplays.com/products/lcdwritinqtablets.html> on Jun. 27, 2012, 3 pages.
"Restriction Requirement", U.S. Appl. No. 13/149,501, (Oct. 19, 2011), 6 pages.
"Restriction Requirement", U.S. Appl. No. 13/471,139, (Jan. 17, 2013), 7 pages.
"Restriction Requirement", U.S. Appl. No. 13/651,304, (Jan. 18, 2013), 7 pages.
"Restriction Requirement", U.S. Appl. No. 13/651,726, (Feb. 22, 2013), 6 pages.
"Restriction Requirement", U.S. Appl. No. 13/651,871, (Feb. 7, 2013), 6 pages.
"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>,(2009), 2 pages.
"SoIRxTM E-Series Multidirectional Phototherapy ExpandableTM 2-Bulb Full Body Panel System", Retrieved from: <http://www.solarcsystems.com/us_multidirectional_uv_light_therapy_1_intro.html > on Jul. 25, 2012,(2011), 4 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, (Jun. 2012), 2 pages.
"Tilt Shift Lenses: Perspective Control", retrieved from http://www.cambridgeincolour.com/tutorials/tilt-shift-lenses1.htm, (Mar. 28, 2008),11 Pages.
"Virtualization Getting Started Guide", *Red Hat Enterprise Linux 6, Edition 0.2*, retrieved from <http://docs.redhat.com/docs/en-US/Red_Hat_Enterprise_Linux/6/html-single/Virtualization_Getting_Started_Guide/index.html> on Jun. 13, 2012, 24 pages.
"What is Active Alignment?", http://www.kasalis.com/active_alignment.html, retrieved on Nov. 22, 2012, 2 Pages.
"What is the PD-Net Project About?", retrieved from <http://pd-net.org/about/> on Mar. 10, 2011, 3 pages.
Block, Steve et al., "DeviceOrientation Event Specification", *W3C, Editor's Draft*,retrieved from <https://developer.palm.com/content/api/dev-guide/pdk/accessing-device-sensors.html> on May 25, 2012,(Jul. 12, 2011),14 pages.
Bos, et al., "Optical Simulation of Liquid Crystal Diffraction", Retrieved from <http://www.lci.kent.edu/ipp/techjournals/Vol %2011/Titus.pdf> on Feb. 14, 2013, 7 pages.
Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.
Butler, Alex et al., "SideSight: Multi-"touch" Interaction around Small Devices", *In the proceedings of the 21st annual ACM symposium on User Interface software and technology.*, retrieved from <http://research.microsoft.com/pubs/132534/sidesight_crv3.pdf> on May 29, 2012,(Oct. 19, 2008), 4 pages.
Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.
Das, Apurba et al., "Study of Heat Transfer through Multilayer Clothing Assemblies: A Theoretical Prediction", Retrieved from <http://www.autexrj.com/cms/zalaczone_pliki/5_013_11.pdf>, (Jun. 2011), 7 pages.
Dietz, Paul H., et al., "A Practical Pressure Sensitive Computer Keyboard", In Proceedings of UIST 2009, (Oct. 2009), 4 pages.
Glatt, Jeff "Channel and Key Pressure (Aftertouch).", Retrieved from: <http://home.roadrunner.com/~jgglatt/tutr/touch.htm> on Jun. 11, 2012, 2 pages.
Hanlon, Mike "ElekTex Smart Fabric Keyboard Goes Wireless", Retrieved from: <http://www.gizmag.com/go/5048/ > on May 7, 2012,(Jan. 15, 2006), 5 pages.
Imai, et al., "Illumination Uniformity of an Edge-Lit Backlight with Emission Angle Control", *In Optics Express* vol. 16, No. 16, Available at <http://www.opticsinfobase.org/view_article.cfm?gotourl=http%3A%2F%2Fwww.opticsinfobase.org%2FDirectPDFAccess%2F69DE147E-0453-91CF- (56) References Cited

OTHER PUBLICATIONS

B9CC4A6D3F80E709__170128%2Foe-16-16-11969. pdf%3Fda%3D1%26id%3D170128%26seq%3D0%26mobile%3Dno&org=>,(Aug. 4, 2008), 6 pages.

Kaur, Sukhmani "Vincent Liew's redesigned laptop satisfies ergonomic needs", Retrieved from: <http://www.designbuzz.com/entry/vincent-liew-s-redesigned-laptop- satisfies-ergonomic-needs/> on Jul. 27, 2012,(Jun. 21, 2010), 4 pages.

Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3,(Jul. 2009), pp. 152-156.

Lee, et al., "Flat-Panel Autostereoscopic View-Sequential 3D Display Backlight", retrieved at <http://www2.eng.carn.ac.uk/~arlt1/04%20Flat-panel%20autostereoscopic%203D%20display%20backlight.pdf> on Aug. 24, 2009, 4 pages.

Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.

McLellan, Charles "Eleksen Wireless Fabric Keyboard: a first look", Retrieved from: <http://www.zdnetasia.com/eleksen-wireless-fabric-keyboard-a-first-look-40278954.htm> on May 7, 2012,(Jul. 17, 2006), 9 pages.

Piltch, Avram "ASUS Eee Pad Slider SL101 Review", Retrieved from: <http://www.laptopmag.com/review/tablets/asus-eee-pad-slider-sl101-aspx>, (Sep. 22, 2011), 5 pages.

Post, E.R. et al., "E-Broidery: Design and Fabrication of Textile-Based Computing", IBM Systems Journal, vol. 39, Issue 3 & 4,(Jul. 2000), pp. 840-860.

Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012),15 pages.

Qin, Yongqiang et al., "pPen: Enabling Authenticated Pen and Touch Interaction on Tabletop Surfaces", *In Proceedings of ITS 2010*, Available at <http://www.dfki.de/its2010/papers/pdf/po172.pdf>,(Nov. 2010), pp. 283-284.

Sumimoto, Mark "Touch & Write: Surface Computing With Touch and Pen Input", Retrieved from: <http://www.gottabemobile.com/2009/08/07/touch-write-surface-computing-with-touch-and-pen-input/> on Jun. 19, 2012,(Aug. 7, 2009), 4 pages.

Takamatsu, Seiichi et al., "Flexible Fabric Keyboard with Conductive Polymer-Coated Fibers", In Proceedings of Sensors 2011,(Oct. 28, 2011), 4 pages.

Tanaka, et al., "Fabrication of a Tapered Structure by Means of Exposure to Diffracted UV", *In International Symposium on Micro-NanoMechatronics and Human Science*, (Nov. 5, 2006), 6 pages.

Travis, Adrian et al., "P-127: Linearity in Flat Panel Wedge Projection", *SID 03 Digest*, retrieved from <http://www2.eng.cam.ac.uk/~arlt1/Linearity%20in%20flat%20panel%20wedge%20projection.pdf>,(May 12, 2005), pp. 716-719.

Travis, Adrian R., et al., "Flat Projection for 3-D", *In Proceedings of the IEEE*, vol. 94 Issue:3, Available at <http://ieeexplore.ieee.org/stamp/stamp.jsp?tp=&arnumber=1605201>,(Mar. 2006), pp. 539-549.

Valliath, G T., "Design of Hologram for Brightness Enhancement in Color LCDs", Retrieved from <http://www.loreti.it/Download/PDF/LCD/44_05.pdf> on Sep. 17, 2012, 5 pages.

Williams, Jim "A Fourth Generation of LCD Backlight Technology", Retrieved from <http://cds.linear.com/docs/Application%20Note/an65f.pdf>, (Nov. 1995), 124 pages.

Yagi, Nobuyuki "The Concept of "AdapTV"", Series: The Challenge of "AdapTV", *Broadcast Technology*, No. 28, (2006), pp. 16-17.

Zhang, et al., "Model-Based Development of Dynamically Adaptive Software", *In proceedings of ICSE 2006*, Available at <http://www.irisa.fr/lande/icse-proceedings/icse/p371.pdf>, (May 20, 2006), pp. 371-380.

"Foreign Notice of Allowance", CN Application No. 201080037117.7, Jan. 21, 2015, 4 Pages.

\* cited by examiner

PHASE CONTROL BACKLIGHT

BACKGROUND

A backlight for a display can be made by injecting light into a light guide embossed with a grating to project parallel rays of light from the light guide to illuminate the display. Displays, however, typically consume a large amount of power to render images for viewing because the display projects the light from the backlight to enable viewers to see the images from any location.

SUMMARY

This document describes techniques and apparatuses for implementing a phase control backlight. A phase control backlight is configured to concentrate light to each pupil of a viewer of a display to cause images to be displayed to each pupil of the viewer. The phase control backlight can include an illuminator and a light guide that includes a diffraction grating. The light guide is configured to receive light rays from the illuminator, and to diffract light rays out of the light guide via the diffraction grating. In accordance with various embodiments, the light guide can be controlled to alter a phase of the light rays as the light rays are guided within the light guide to cause the diffracted light rays to converge to a concentration point that corresponds to a position in space of each pupil of the viewer.

This summary is provided to introduce simplified concepts in a simplified form that are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for implementing a phase control backlight are described with reference to the following drawings. The same numbers are used throughout the drawings to reference like features and components.

DETAILED DESCRIPTION

Overview

This document describes techniques and apparatuses for implementing a phase control backlight. A phase control backlight is configured to concentrate light to each pupil of a viewer of a display to cause images to be displayed to each pupil of the viewer. The phase control backlight can include an illuminator and a light guide that includes a diffraction grating. The light guide is configured to receive light rays from the illuminator, and to diffract light rays out of the light guide via the diffraction grating. In accordance with various embodiments, the light guide can be controlled to alter a phase of the light rays as the light rays are guided within the light guide to cause the diffracted light rays to converge to a concentration point that corresponds to a position in space of each pupil of the viewer.

In some embodiments, the phase control backlight includes an illuminator and a light guide that includes a liquid crystal layer within the light guide and a diffraction grating. The light guide is configured to receive light rays from the illuminator, and to diffract the light rays out of the light guide via the diffraction grating. The liquid crystal layer of the light guide is controlled to alter a phase, or direction, of the light rays propagating in the light guide to cause the diffracted light rays to converge to a concentration point. In some embodiments, a distance of the concentration point from the light guide can be controlled by altering a pitch of the liquid crystal layer.

Example Environment

Figure 1:
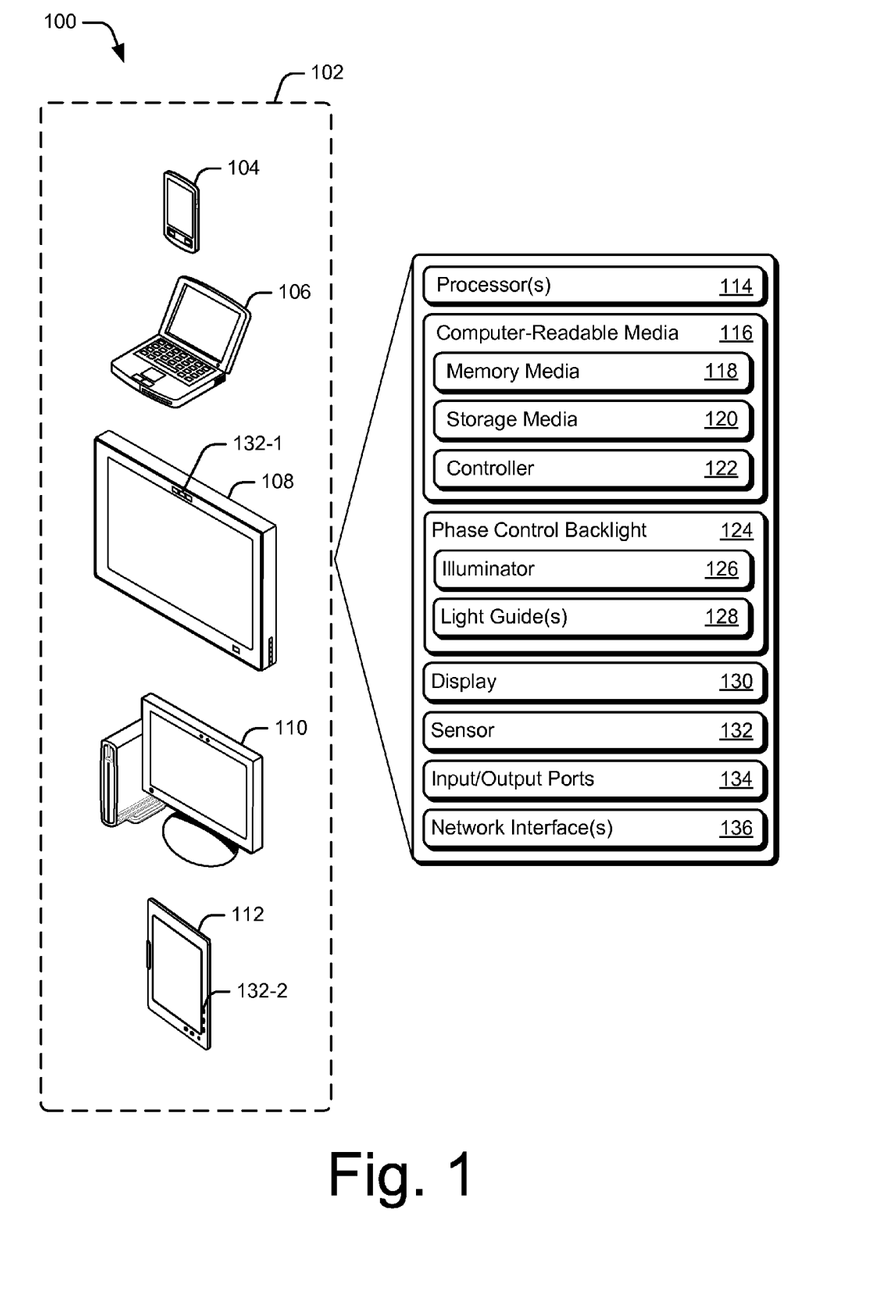
FIG. 1 illustrates an example environment in which a phase control backlight can be implemented.

FIG. 1 is an illustration of an example environment 100 in which a phase control backlight (backlight) can be implemented. Environment 100 can be implemented in a display device 102, which is illustrated, by way of example and not limitation, as one of a smart phone 104, laptop computer 106, television device 108, desktop computer 110, or tablet computer 112. Generally, display device 102 can provide two-dimensional (2D) content to a viewer by displaying a same image to each pupil of the viewer, or three-dimensional (3D) content to the viewer by displaying different images to each pupil. 3D content may comprise images (e.g., stereoscopic imagery) and/or video effective to cause a viewer to be able to perceive depth within the content when displayed.

Display device 102 includes processor(s) 114 and computer-readable media 116, which includes memory media 118 and storage media 120. Applications and/or an operating system (not shown) embodied as computer-readable instructions on computer-readable media 116 can be executed by processor(s) 114 to provide some or all of the functionalities described herein. Computer-readable media also includes a phase control backlight controller (controller) 122. How controller 122 is implemented and used varies, and is described in further detail below.

Display device 102 also includes a phase control backlight (backlight) 124 that includes an illuminator 126 and a light guide 128 that includes a diffraction grating. Light guide 128 can be configured as a polyhedral waveguide that transmits light by total internal reflection. Light guide 128 is configured to receive light rays from illuminator 126, and to diffract light rays out of the light guide via the diffraction grating. As will be described in more detail below, controller 122 can control light guide 128 to alter a phase of the light rays as the light rays are guided within light guide 128 to cause the diffracted light rays to converge to a concentration point.

Illuminator 126 may be implemented, by way of example and not limitation, as lasers, light-emitting diodes (LEDs), compact cylindrical fluorescent light sources (CCFL), or any other type of light source configured for use in a display device. In some embodiments, illuminator 126 can be implemented as one or more lasers, such as a red laser, green laser, and blue laser. The red, green, and blue lasers may be semiconductor lasers, such as low-power diode lasers, or any other suitable lasers. The red, green, and blue lasers can be independently biased and modulated by controller 122. Illuminator 126 may also include merging optics that are configured to merge the monochromatic emission from each of the lasers to form a beam or ray of light. As described herein, the term "light ray" will be used to describe a "beam" or "ray" of light emitted by illuminator 126. In some embodiments, illuminator 126 can be controlled to form circularly-polarized light rays.

Display device 102 also includes a display 130, a sensor 132, input/output (I/O) ports 134, and network interface(s) 136. Display 130 is positioned in front of backlight 124, and may be implemented as a high resolution, flat-panel electronic display, such as a high-resolution liquid crystal display (LCD) which may be configured as a hologram. When illuminated by backlight 124, display 130 generates 3D content that can be viewed by a viewer without the use of special eyewear. Display 130 may be separate or integral with display device 102; integral examples include smart phone 104, laptop computer 106, and tablet computer 112; separate examples include television device 108 and, in some instances, desktop computer 110 (e.g., when embodied as a separate tower and monitor (shown)).

Sensor 132 collects viewer positional data to determine a position in space of each pupil of a viewer relative display 130. The viewer positional data can be used to determine a distance of each pupil of the viewer from display 130 (relative Z-position), a distance of each pupil of the viewer from a horizontal axis of display 130 (relative Y-position), and a distance of each pupil of the viewer from a vertical axis of display 130 (relative X-position). Sensor 132 may be separate or integral with display device 102; integral examples include sensor 132-1 of television device 108 and sensor 132-2 of tablet computer 112; separate examples include stand-alone sensors, such as sensors operably coupled with display device 102, a set-top box, or a gaming device.

Sensor 132 can collect viewer positional data by way of various sensing technologies, either working alone or in conjunction with one another. Sensing technologies may include, by way of example and not limitation, optical, radio-frequency, acoustic (active or passive), micro-electromechanical systems (MEMS), ultrasonic, infrared, pressure sensitive, and the like. In some embodiments, sensor 132 may receive additional data or work in conjunction with a remote control device or gaming controller associated with one or more viewers to generate the viewer positional data. As will be described in more detail below, sensor 132 can provide the viewer positional data to controller 122 to enable controller 122 to control backlight 124 to illuminate display 130 to render images that concentrate to each pupil of one or more viewers.

I/O ports 134 of display device 102 enable interaction with other devices, media, or users. I/O ports 134 can include a variety of ports, such as by way of example and not limitation, high-definition multimedia (HDMI), digital video interface (DVI), display port, fiber-optic or light-based, audio ports (e.g., analog, optical, or digital), USB ports, serial advanced technology attachment (SATA) ports, peripheral component interconnect (PCI) express based ports or card slots, serial ports, parallel ports, or other legacy ports. In at least some instances, 2D or 3D content is received by display device 102 via one or more I/O ports 134 from another device or source (e.g., a set-top box or content receiving device).

Display device 102 may also include network interface(s) 136 for communicating data over wired, wireless, or optical networks. Data communicated over such networks may include 2D or 3D content that can be displayed or interacted with via display 130. By way of example and not limitation, network interface 136 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Figure 2:
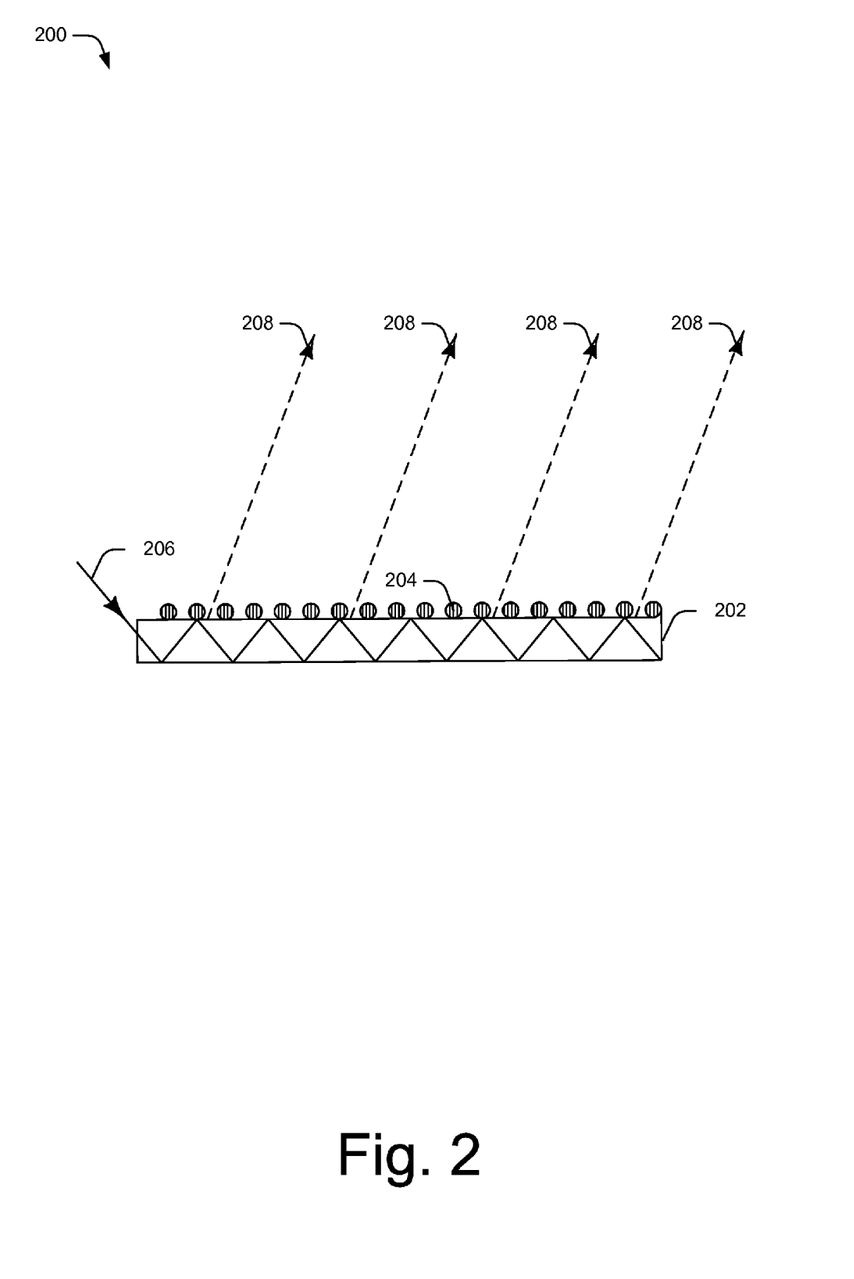
FIG. 2 illustrates an example of a light guide embossed with a diffraction grating.

FIG. 2 illustrates an example 200 of a light guide 202 embossed with a diffraction grating 204. In this example, when illuminator 126 injects a light ray 206 into light guide 202, the light ray is guided by total internal reflection within the light guide. The parallel sides of light guide 202 causes the angle of light ray 206 to remain the same each time the light ray reflects off a side of light guide 202. Each time light ray 206 hits diffraction grating 204, however, the diffraction grating diffracts a portion of light ray 206 from light guide 202 to form diffracted light rays 208. Because the phase or angle of light ray 204 inside light guide 202 is constant, diffracted light rays 208 are parallel to each other.

Light guide 202 can be used, in conjunction with an illuminator, to form a backlight that could illuminate display 130 to create images for viewing. Displays, however, typically consume a large amount of power to render images for viewing because the display must project all of the light rays from the backlight so that viewers can view the image from any location. It is to be appreciated, therefore, that the power consumption of display 130 could be greatly reduced by concentrating all the light from backlight 124 into the pupils of viewers.

Figure 3:
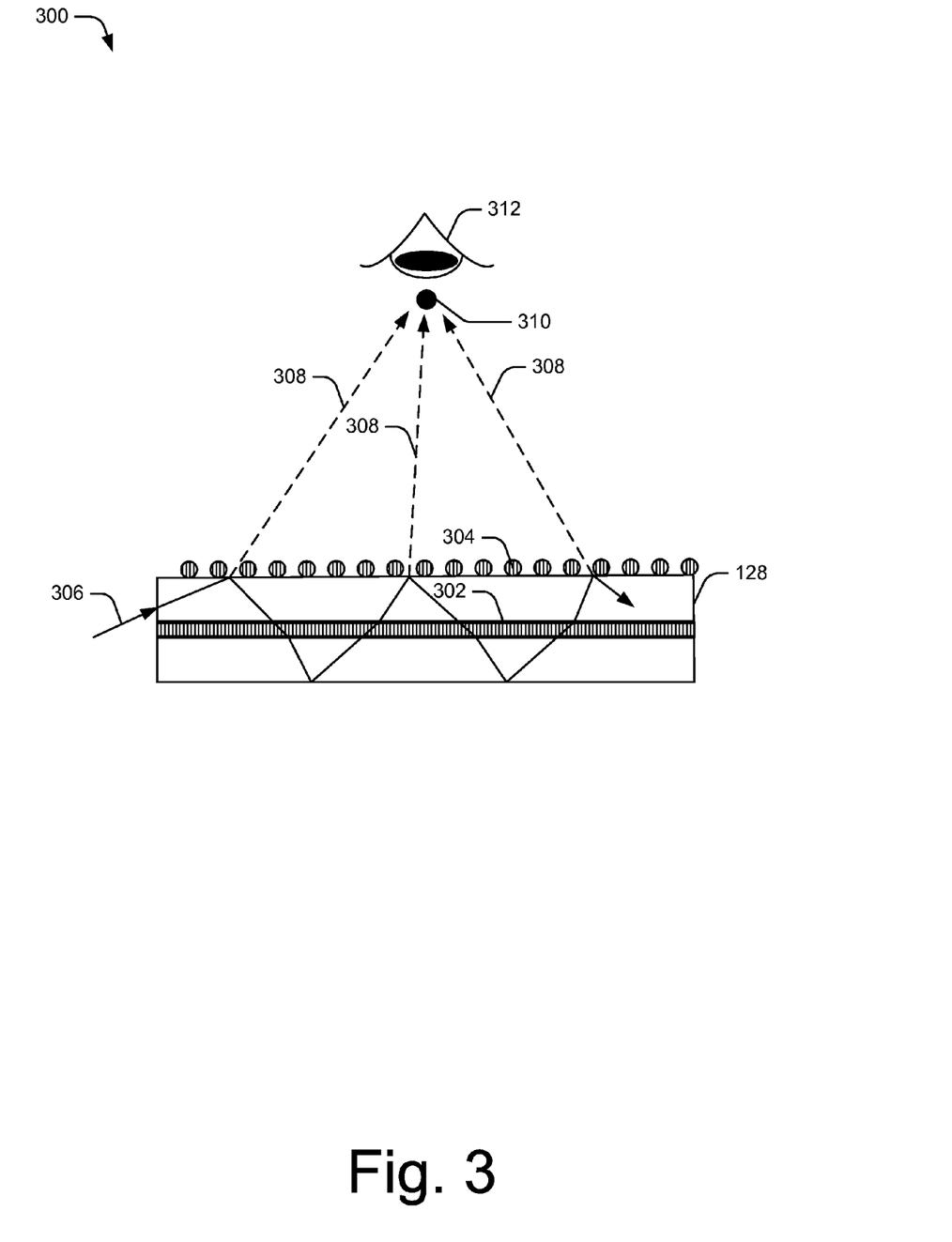
FIG. 3 illustrates a detailed example of a light guide of a phase control backlight.

FIG. 3 illustrates a detailed example 300 of light guide 128 of phase control backlight 124. In this example, light guide 128 includes a liquid crystal layer 302 within the light guide and a diffraction grating 304. In some embodiments, diffraction grating 304 can be embossed on an outer surface of the light guide. In other embodiments, diffraction grating 304 can be implemented as a volume grating. Liquid crystal layer 302 may be positioned within a central plane of light guide 128. In some embodiments, light guide 128 can be constructed by placing a layer of liquid crystal between a pair of transparent slabs. Light guide 128 is configured to receive a light ray 306 from illuminator 126, and to diffract light rays 308 out of the light guide via diffraction grating 304. Illuminator 126 can be configured as one or more lasers that inject polarized laser light rays into light guide 128.

In some embodiments, both sides of liquid crystal layer 302 include pixelated transparent conductors that configure liquid crystal layer 302 as a liquid crystal diffraction grating that can be controlled to alter the phase or direction of light ray 306 as light ray 306 propagates within light guide 128. For example, in FIG. 3, each time light ray 306 contacts liquid crystal layer 302, the phase or direction of light ray 306 is altered by the liquid crystal pixels of liquid crystal layer 302. Altering the direction of light ray 306, causes light ray 306 to contact the edges of light guide 128 at different angles which prevents diffracted light rays 308 from being diffracted out of light guide 128 in parallel to each other. In at least some embodiments, layer 302 may be implemented as a material other than liquid crystal. For example, layer 302 may be implemented as a piezoelectric layer that is can be controlled to alter the phase or direction of light ray 306.

A conventional diffraction grating may diffract light into several orders on either side of the zero order. However, when light ray 306 is controlled to be in an appropriate polarization state by controller 122, liquid crystal layer 302 is able to diffract a substantial portion of light ray 306 into the first order, or an opposite order, but the light ray is not split. Note that the changes in direction of light ray 306 in light guide 128 are small due to the fact that it may be difficult to electronically configure liquid crystal layer 302 with pixels much smaller than 10 microns. As light ray 306 propagates within light guide 128, however, the changes in direction of light ray 306 accumulate, causing diffracted light rays 308 to converge to a concentration point 310 in front of light guide 128 when they are diffracted out of light guide 128 via diffraction grating 304.

In accordance with various embodiments, controller 122 can control a distance of concentration point 310 from display 130 (relative Z-position) by altering a pitch of liquid crystal layer 302. For example, controller 122 can cause the pitch of liquid crystal layer 302 to vary from low-to-high to cause the distance of concentration point 310 from light guide 128 to move closer or further from the light guide. Controller 122 can also control the distance of concentration point 310 from display 130 by controlling the polarization state of light ray 306. For example, liquid crystal layer 302 causes concentration point 310 to move closer to display 130 when light ray 306 is configured with a first state of polarization. However, liquid crystal layer 302 causes concentration point 310 to move further from light guide 128 when light ray 306 is configured with an opposite state of polarization.

As will be described in more detail below, controller 122 can also control concentration point 310 of diffracted light rays 308 to move side-to-side to change the relative X-position of concentration point 310, and to move up-and-down to change the relative Y-position of concentration point 310. Thus, light guide 128 can be controlled to position concentration point 310 at a position in space that corresponds to the position of a pupil 312 of a viewer.

Figure 4:
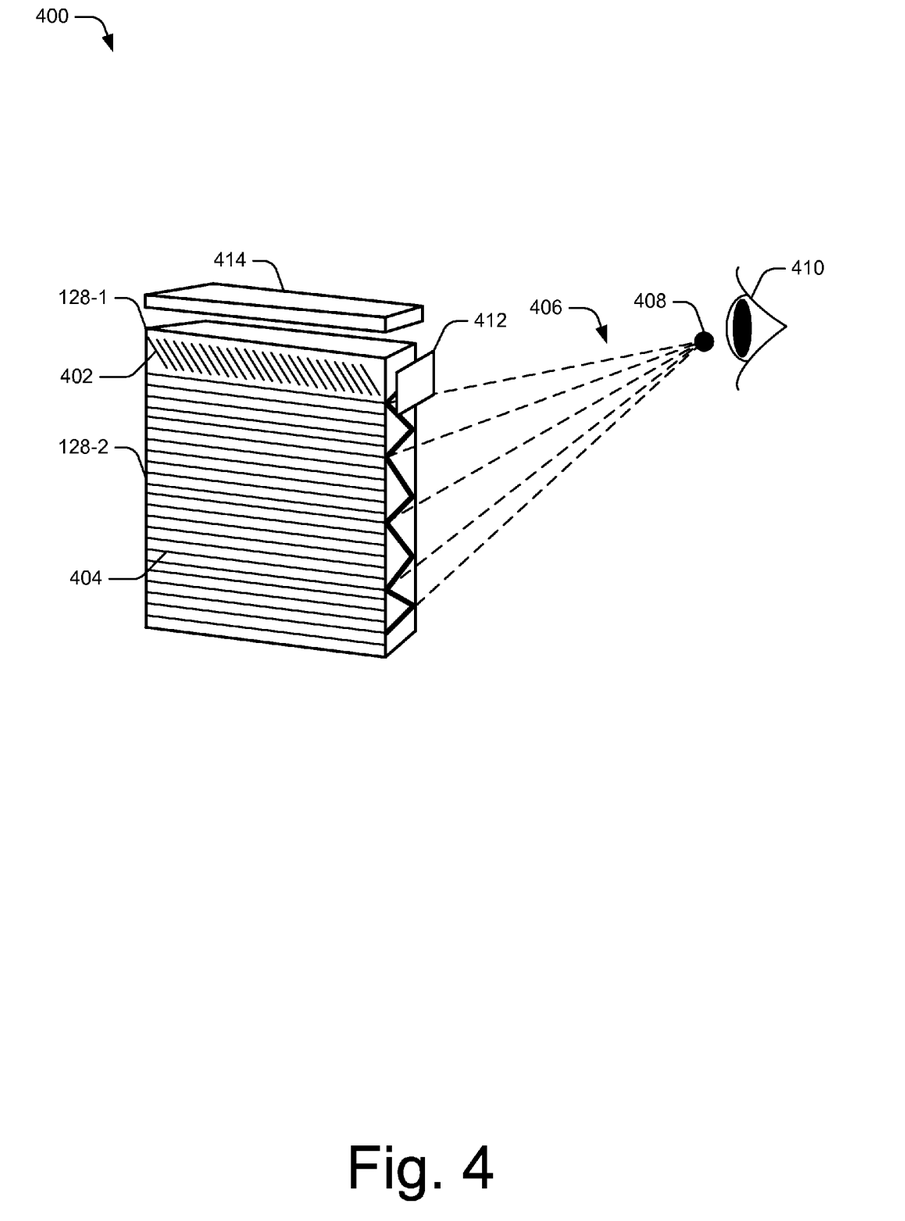
FIG. 4 illustrates an example of a phase a control backlight.

FIG. 4 illustrates an example 400 of phase control backlight 124 in accordance with various embodiments. In example 400, backlight 124 includes a first light guide 128-1 and a second light guide 128-2. Similar to light guide 128 of FIG. 3, light guides 128-1 and 128-2 are each configured with a liquid crystal layer, which is not illustrated in FIG. 4. In some embodiments, the liquid crystal layers in light guides 128-1 and 128-2 are pixilated in a direction orthogonal to each other. In addition, light guides 128-1 and 128-2 include diffraction gratings 402 and 404, respectively. In this example, diffraction grating 402 is angled at 45 degrees to first light guide 128-1, and diffraction grating 402 is angled parallel to second light guide 128-2. In some embodiments, light guides 128-1 and 128-2 may be implemented in a single light guide, where first light guide 128-1 makes up a first portion of light guide 128 and second light guide 128-2 makes up a second portion of light guide 128.

In accordance with various embodiments, controller 122 is configured to control light guides 128-1 and 128-2 of backlight 124 to cause diffracted light rays 406, diffracted out of second light guide 128-2 via diffraction grating 404, to converge to a concentration point 408 that corresponds to a position in space of a pupil 410 of a viewer. The position in space of pupil 410 can be determined from viewer positional data received from sensor 132. The positional data can include a distance of pupil 410 from display 130 (relative Z-position), a distance of pupil 410 from a horizontal axis of display 130 (relative Y-position), and a distance of pupil 410 from a vertical axis of display 130 (relative X-position). Display 130 is positioned in front of backlight 124, and is configured to display images to pupil 410 of the viewer (e.g., 2D or 3D images) when diffracted light rays 406 converge to concentration point 408.

Controller 122 is configured to control the liquid crystal layers in both first light guide 128-1 and second light guide 128-2 to cause diffracted light rays 406 to converge to concentration point 408. For example, controller 122 can control concentration point 408 to move closer or further from display 130 by electronically altering the pitch of the liquid crystal layers in light guides 128-1 and 128-2. This is described in more detail above with regards to FIG. 3.

In example 400, backlight 124 further includes a first redirection optic 412 and a second redirection optic 414, which can each be implemented as a scanning mirror or any other type of mirror or refractive structure that reflects light. In some embodiments, controller 122 is configured to scan concentration point 408 of diffracted light rays 406 side-to-side by controlling first redirection optic 412 to alter an injection angle of the light rays injected into first light guide 128-1 by illuminator 126. Scanning concentration point 408 side-to-side enables controller 122 to concentrate diffracted light rays 406 to the relative X-position of pupil 410.

For example, when illuminator 126 injects a light ray into first light guide 128-1, the light ray passes through first light guide 128-1 and encounters first redirection optic 412. First redirection optic 412 reflects the light ray back into first light guide 128-1 at an angle greater than the critical angle for total internal reflection. To scan the input angle of the light ray side-to-side, controller 122 controls first redirection optic 412 to tilt on the Y-axis which causes concentration point 408 to move side-to-side.

After reflecting off of first redirection optic 412, the light ray propagates away from first redirection optic 412 and into first light guide 128-1 by total internal reflection, and diffracted components of the light ray are then diffracted out of first light guide 128-1 towards second redirection optic 414 each time the light ray encounters diffraction grating 402. Second redirection optic 414 reflects the diffracted components of the light ray through first light guide 128-1 and into second light guide 128-2.

In some embodiments, controller 122 is configured to scan concentration point 408 of diffracted light rays 406 up-and-down by controlling second redirection optic 414 to alter an input angle of the diffracted components of the light ray diffracted out of first light guide 128-1 into second light guide 128-2. Scanning concentration point 408 up-and-down enables controller 122 to concentrate diffracted light rays 406 to the relative Y-position of pupil 410. To scan the input angle of the diffracted components of the light ray up-and-down, controller 122 causes second redirection optic 414 to tilt on the X-axis, which causes concentration point 408 to move up-and-down.

It is to be noted that controller 122 can receive viewer positional data from multiple different users corresponding to positions in space of each pupil of each of the multiple users. Controller 122 can then control backlight 124 to concentrate light to the positions in space of each pupil of each of the multiple users to cause display 130 to render an image to each pupil of each of the multiple users.

Example Method

Figure 5:
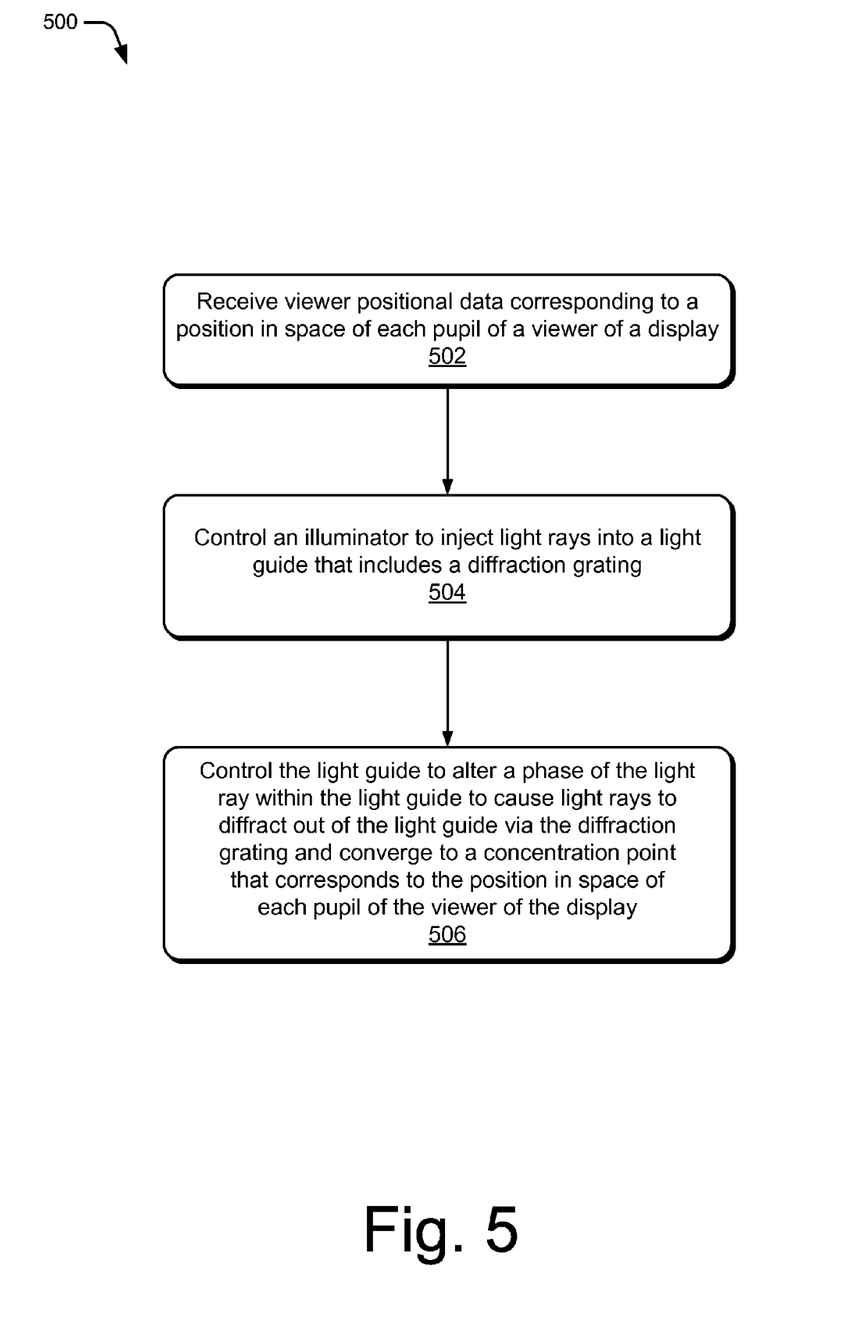
FIG. 5 illustrates an example method for controlling a phase control backlight.

FIG. 5 is flow diagram depicting an example method 500 for controlling a phase control backlight. Block 502 receives viewer positional data corresponding to a position in space of each pupil of a viewer of a display. For example, controller 122 (FIG. 1) receives viewer positional data from sensor 132 that corresponds to a position in space of each pupil of a viewer of display 130.

Block 504 controls an illuminator to inject a light ray into a light guide that includes a diffraction grating. For example, controller 122 controls an illuminator 126 to inject a light ray into light guide 128 that includes diffraction grating 304. In some embodiments, light guide 128 further includes liquid crystal layer 302 within the light guide.

Block 506 controls the light guide to alter a phase of the light ray within the light guide to cause light rays to diffract out of the light guide via the diffraction grating and converge to a concentration point that corresponds to the position in space of each pupil of the viewer of the display. For example, controller 122 controls light guide 128 to alter a phase of the light ray within light guide 128 to cause light rays to diffract out of light guide 128 via diffraction grating 304 and converge to a concentration point that corresponds to the position in space of each pupil of the viewer of the display. In some embodiments, controller 122 controls liquid crystal layer 302 to alter the phase of the light ray to cause light rays to diffract out of light guide 128 via diffraction grating 304 and to converge to a concentration point that corresponds to the position in space of each pupil of the viewer of display 130. The controlling causes a display positioned in front of the light guide to display a three-dimensional image to each pupil of the viewer when the diffracted light rays converge to the concentration point.

In some embodiments, controller 122 can control a distance of the concentration point from display 130, as well as a horizontal position and a vertical position of the concentration point relative to display 130. To control the distance of the concentration point from display 130, controller 122 can electronically alter a pitch of liquid crystal layer 302. Controller 122 can also control the horizontal position of the concentration point by controlling a redirection optic to scan the concentration point side-to-side, and control the vertical position of the concentration point by controlling an additional redirection optic to scan the concentration point up-and-down.

In some embodiments, controller 122 is further configured to receive additional positional data corresponding to an additional position in space of each pupil of an additional viewer of display 130. Controller 122 can then control illuminator 126 to inject additional light rays into light guide 128, and control light guide 128 to alter a phase of the additional light rays within light guide 128 to cause additional light rays to diffract out of the light guide via diffraction grating 304 and converge to a concentration point that corresponds to the additional position in space of each pupil of the additional viewer of display 130.

Example Device

Figure 6:
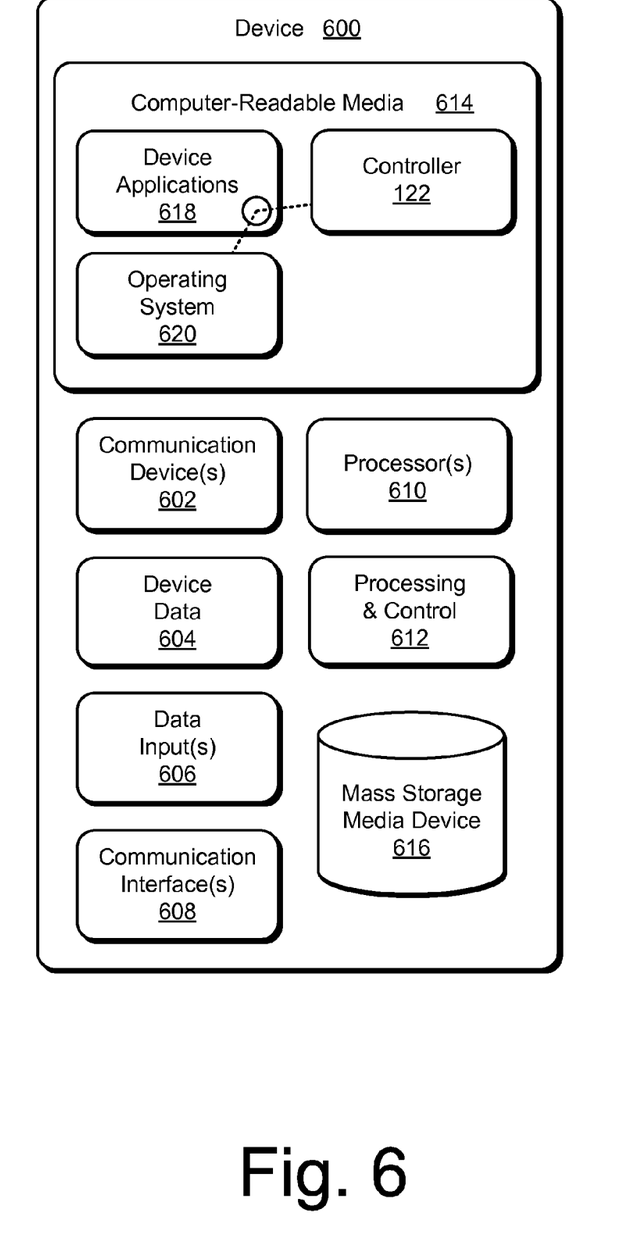
FIG. 6 illustrates an example device in which a phase control backlight can be implemented.

FIG. 6 illustrates various components of an example device 600 that can be implemented as any type of client, server, and/or display device as described with reference to the previous FIGS. 1-5 to implement techniques enabling a phase control backlight. In embodiments, device 600 can be implemented as one or a combination of a wired and/or wireless device, a head-mounted display device (e.g., eyeglasses, sunglasses, etc.) as a form of flat panel display, television, television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 600 may also be associated with a viewer (e.g., a person or user) and/or an entity that operates the device such that a device describes logical devices that include users, software, firmware, and/or a combination of devices.

Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608, which can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like), which process various computer-executable instructions to control the operation of device 600 and to enable techniques for implementing a phase control backlight. Alternatively or in addition, device 600 can be implemented with any one or combination of hardware, firmware, a system-on-chip (SoC), or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable storage media 614, such as one or more memory devices that enable persistent and/or non-transitory data storage (i.e., in contrast to mere signal transmission), examples of which include random access memory (RAM), non-volatile memory (e.g., any one or more of a read-only memory (ROM), non-volatile RAM (NVRAM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable storage media 614 provides data storage mechanisms to store the device data 604, as well as various device applications 618 and any other types of information and/or data related to operational aspects of device 600. For example, an operating system 620 can be maintained as a computer application with the computer-readable storage media 614 and executed on processors 610. The device applications 618 may include a device manager, such as any form of a control application, software application, signal-processing and control module, code that is native to a particular device, a hardware abstraction layer for a particular device, and so on.

The device applications 618 also include any system components or modules to implement techniques using or enabling a phase control backlight. In this example, the device applications 618 can include controller 122 for controlling a phase control backlight.

CONCLUSION

This document describes various apparatuses and techniques for implementing a phase control backlight. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A display device comprising:
   a backlight comprising an illuminator and a light guide, the light guide including:
      a liquid crystal layer positioned within a central plane of the light guide; and
      a diffraction grating, the illuminator configured to inject light rays into the light guide, and the diffraction grating configured to diffract light rays out of the light guide;
   a display positioned in front of the backlight;
   a sensor configured to collect viewer positional data to determine a position in space of each pupil of a viewer relative to the display; and
   a controller configured to control the liquid crystal layer to cause the diffracted light rays to converge to a concentration point that corresponds to the position in space of each pupil of the viewer, the display configured to display an image to each pupil of the viewer when the diffracted light rays converge to the concentration point that corresponds to the position in space of each pupil of the viewer.

2. The display device of claim 1, wherein the controller is further configured to control a distance of the concentration point from the display by electronically altering a pitch of the liquid crystal layer to move the concentration point forwards and backwards from the display.

3. The display device of claim 1, wherein the backlight further comprises a redirection optic, and wherein the controller is further configured to scan the concentration point of the diffracted light rays side-to-side by controlling the redirection optic to alter an injection angle of the light rays injected into the light guide.

4. The display device of claim 3, wherein the backlight further comprises:
   an additional light guide including an additional liquid crystal layer within the additional light guide, and an additional diffraction grating;
   an additional redirection optic; and
   wherein the controller is further configured to scan the concentration point up-and-down by controlling the additional redirection optic to alter an injection angle of light rays diffracted out of the light guide into the additional light guide.

5. The display device of claim 4, wherein the liquid crystal layer and the additional liquid crystal layer are pixelated in a direction orthogonal to each other.

6. The display device of claim 1, wherein both sides of the liquid crystal layer comprise pixelated transparent conductors that configure the liquid crystal layer as a liquid crystal diffraction grating.

7. The display device of claim 1, wherein the liquid crystal layer is positioned within the central plane of the light guide between two transparent slabs.

8. The display device of claim 1, wherein the viewer positional data comprises a distance of each pupil of the viewer from the display, a distance of each pupil of the viewer from a horizontal axis of the display, and a distance of each pupil of the viewer from a vertical axis of the display.

9. The display device of claim 1, wherein the liquid crystal layer is further configured to alter the phase or direction of the light rays when the light rays contact the liquid crystal layer, the altering effective to prevent the diffracted light rays from being diffracted out of the light guide parallel to each other.

10. A method comprising:
   receiving viewer positional data corresponding to a position in space of each pupil of a viewer of a display;
   controlling an illuminator to inject a light ray into a light guide that includes:
      a liquid crystal layer positioned within a central plane of the light guide; and
      a diffraction grating; and
   controlling the liquid crystal layer to alter a phase of the light ray within the light guide to cause light rays to diffract out of the light guide via the diffracting grating and converge to a concentration point that corresponds to the position in space of each pupil of the viewer of the display.

11. The method of claim 10, wherein the illuminator and the light guide comprise a backlight configured to illuminate a display positioned in front of the backlight, the display configured to display an image to each pupil of the viewer when the light rays diffracted out of the light guide converge to the concentration point.

12. The method of claim 10, wherein the controlling further comprises controlling a distance of the concentration point from the display by electronically altering a pitch of the liquid crystal layer.

13. The method of claim 10, wherein the controlling further comprises controlling a horizontal position of the concentration point by controlling a redirection optic to scan the concentration point side-to-side.

14. The method of claim 13, wherein the controlling further comprises controlling a vertical position of the concentration point by controlling an additional redirection optic to scan the concentration point up-and-down.

15. The method of claim 10, further comprising:
   receiving additional viewer positional data corresponding to an additional position in space of each pupil of an additional viewer of the display;
   controlling the illuminator to an additional light ray into the light guide; and
   controlling the light guide to alter a phase of the additional light ray within the light guide to cause additional light rays to diffract out of the light guide via the diffracting grating and converge to an additional concentration point that corresponds to the additional position in space of each pupil of the additional viewer of the display.

16. A backlight comprising:
   an illuminator; and
   a light guide comprising:
      a liquid crystal layer positioned within a central plane of the light guide; and
      a diffraction grating,
      the light guide configured to receive light rays from the illuminator, and to diffract the light rays out of the light guide via the diffraction grating, the liquid crystal layer configured to alter a direction of the light rays propagating in the light guide to cause the diffracted light rays to converge to a concentration point.

17. The backlight of in claim 16, wherein the illuminator comprises multiple lasers that are configured to inject polarized laser light rays into the light guide.

18. The backlight of claim 16, wherein the backlight is configured to illuminate a liquid crystal display (LCD), the LCD configured to display an image to each pupil of a viewer when the diffracted light rays converge to the concentration point that corresponds to a position in space of each pupil of the viewer.

19. The backlight of claim 16, wherein a pitch of the liquid crystal layer can be electronically altered to cause the concentration point of the diffracted light rays to move closer or further from the light guide.

20. The backlight of claim 16, wherein the backlight further comprises a first redirection optic configured to scan the concentration point of the diffracted light rays side-to-side, and a second redirection optic configured to scan the concentration point of the diffracted light rays up- and down.

* * * * *